(12) United States Patent  
Mugler et al.

(10) Patent No.: US 8,606,839 B2  
(45) Date of Patent: Dec. 10, 2013

(54) INTERLEAVED METHOD FOR PARALLEL IMPLEMENTATION OF THE FAST FOURIER TRANSFORM

(75) Inventors: Dale H. Mugler, Hudson, OH (US); Nilimb Misal, Akron, OH (US)

(73) Assignee: The University of Akron, Akron, OH (US)

( * ) Notice: Subject to any disclaimer, the term of this patent is extended or adjusted under 35 U.S.C. 154(b) by 1339 days.

(21) Appl. No.: 12/195,711

(22) Filed: Aug. 21, 2008

(65) Prior Publication Data

US 2009/0049112 A1 Feb. 19, 2009

Related U.S. Application Data

(63) Continuation-in-part of application No. PCT/US2007/004740, filed on Feb. 22, 2007.

(60) Provisional application No. 60/880,560, filed on Jan. 16, 2007, provisional application No. 60/775,475, filed on Feb. 22, 2006.

(51) Int. Cl.  
*G06F 15/00* (2006.01)

(52) U.S. Cl.  
USPC ........... 708/404; 708/402; 708/403; 708/405; 708/400

(58) Field of Classification Search  
USPC .................... 708/404, 400, 402, 403, 405  
See application file for complete search history.

(56) References Cited

U.S. PATENT DOCUMENTS

| | | | |
|---|---|---|---|
| 3,871,577 A | | 3/1975 | Avellar |
| 5,991,787 A | * | 11/1999 | Abel et al. .................... 708/400 |
| 6,006,245 A | * | 12/1999 | Thayer .......................... 708/404 |
| 6,230,177 B1 | | 5/2001 | Gossett |
| 2002/0184279 A1 | | 12/2002 | Kechriotis |
| 2003/0043918 A1 | * | 3/2003 | Jiang et al. ............... 375/240.25 |
| 2003/0204544 A1 | * | 10/2003 | Yu et al. ........................ 708/404 |
| 2003/0215154 A1 | * | 11/2003 | Pauly et al. ................... 382/254 |
| 2006/0095492 A1 | * | 5/2006 | Brown et al. ................. 708/404 |
| 2006/0264735 A1 | * | 11/2006 | Stemmer ....................... 600/410 |

OTHER PUBLICATIONS

Mugler et al ("Eigenvectors for a class of Discrete Cosine and Sine Transforms"), Jan. 2004.*

Haitao Guo, Gary A. Sitton, and C. Sydney Burrus, "The Quick Fourier Transform: An FFT Based on Symmetries", IEEE Transactions on Signal Processing, vol. 46, No. 2, Feb. 1998, pp. 335-341.

Juan G. Vargas-Rubio and Balu Santhanam, "On the Multiangle Centered Discrete Fractional Fourier Transform", IEEE Signal Processing Letters, vol. 12, No. 4, Apr. 2005, pp. 273-276.

(Continued)

*Primary Examiner* — Chuong D Ngo  
*Assistant Examiner* — Jae Jeon  
(74) *Attorney, Agent, or Firm* — Renner, Kenner, Greive, Bobak, Taylor & Weber

(57) ABSTRACT

A method for computing a fast Fourier transform (FFT) in a parallel processing structure uses an interleaved computation process. In particular, the interleaved FFT computation process intertwines the output of two different shifted Fourier matrices to obtain a Fourier transform of an input vector. Next, an even-odd extension process is applied to the transformed input vector, whereupon various terms are grouped in a computational tree. As such, the resulting segmentation of the computation allows the fast Fourier transform to be computed in a parallel manner.

3 Claims, 9 Drawing Sheets

(56) References Cited

OTHER PUBLICATIONS

Soo-Chang Pei and Jian-Jiun Ding, "Generalized Eigenvectors and Fractionalization of Offset DFTs and DCTs", IEEE Transactions on Signal Processing, vol. 52, No. 7, Jul. 2004, pp. 2032-2046.

Dale H. Mugler, "The Centered Discrete Fourier Transform and a Parallel Implementation of the FFT", 2011 IEEE International Conference on Acoustics, Speech and Signal Processing (ICASSP 2011), Prague, Czech Republic, May 22, 2011, pp. 1725-1728.

Ameen Baig Mirza, "Parallel Computation of the Interleaved Fast Fourier Transform with MPI", Master's Thesis, Computer Science, University of Akron, Dec. 2008.

Vinod Jagtap, "Fast Fourier Transform Using Parallel Processing for Medical Applications", Master's Thesis, Computer Science, University of Akron, May 2010.

P. Lee and F.-Y. Huang, Restructured Recursive DCT and DST Algorithms, IEEE Trans. Sig. Proc., v 42 (7), pp. 1600-1609, 1994.

Z. Cvetkovic and M.V. Pepovic, New Fast Recursive Algorithms for the Computation of Discrete Cosine and Sine Transforms, IEEE Trans. Sig. Proc., v. 40 (8), pp. 2083-2086, 1992.

C.W. Kok, Fast Algorithm for Computing Discrete Cosine Transform, IEEE Trans. Sig. Proc., v. 45 (3), pp. 757-760, 1997.

S. Strang, The Discrete Cosine Transform, SIAM Review, 41, 135 to 147, 1999.

S. Clary and D.H. Mugler, Shifted Fourier Matrices and Their Tridiagonal Commutors, SIAM J. Matrix Anal. and Appl. 24 (3), 809-821, 2003.

D.H. Mugler and S. Clary, Engenvectors for a Class of Discrete Cosine and Sine Transforms, Proceedings to the Intl. Workshop on Sampling Theory, Samp TA'03, Salzburg, 2003.

N. Misal, Master's Thesis, Biomedical Engineering, The University of Akron, Dec. 2006.

\* cited by examiner

INTERLEAVED METHOD FOR PARALLEL IMPLEMENTATION OF THE FAST FOURIER TRANSFORM

FIELD OF THE INVENTION

The present invention generally relates to a method for computing a Fast Fourier Transform (FFT). In one embodiment, the present invention relates to an interleaved method for computing a Fast Fourier Transform (FFT).

BACKGROUND OF THE INVENTION

A Fast Fourier Transform (FFT) is an efficient algorithm to compute the Discrete Fourier Transform (DFT) and its inverse. FFTs are of great importance to a wide variety of applications, from digital signal processing to solving partial differential equations to algorithms for quickly multiplying large integers.

Accordingly, there is a need in the art for an improved method for computing a Fast Fourier Transform (FFT).

SUMMARY OF THE INVENTION

The present invention generally relates to a method for computing a Fast Fourier Transform (FFT). In one embodiment, the present invention relates to an interleaved method for computing a Fast Fourier Transform (FFT). In another embodiment, the present invention relates to a method for parallel filter via Fast Fourier Transform (FFT).

In one embodiment, the present invention relates to a method for computing a Fast Fourier Transform (FFT) comprising the steps of: (i) inputting at least one set of vector values of a vector x; (ii) computing at least one sum and at least one difference from the input set of vector values from vector x; (iii) calculating at least one set of halves of an even/odd versions of at least one set of results from Step (ii); (iv) computing at least one set of DCT/DST of the even/odd halves, respectively; (v) extending the results of the computation of Step (iv) and combining the results using appropriate means; (vi) outputting at least one value with a correct magnitude at one or more desired locations; and (vii) interleaving, where applicable, the at least one value.

In one instance, in the above method Step (ii) is a preprocessing step. In one instance, in the above method Step (v) is accomplished using symmetries.

In one instance, in the above method Step (v) is accomplished using one or more of the following Equations:

$$F_C \cdot x = yex + i \cdot yox,$$

$$F_D \cdot x = ydex + i \cdot ydox,$$

$$F_C^{-1} \cdot x = yex - i \cdot yox, \text{ or}$$

$$F_D^{-1} \cdot x = ydex - i \cdot ydox.$$

In one embodiment, the one or more desired locations of Step (vi) include $F_C$ outputs at locations 1; 3; 5; ... n−1, where the vector output is labeled 0 through n−1. In another embodiment, the one or more desired locations of Step (vi) include $F_C$ outputs at locations 2; 6; 10; ... n−2. In still another embodiment, the one or more desired locations of Step (vi) include $F_C$ outputs at locations n/8; 3n/8; 5n/8; 7n/8. In still yet another embodiment, the one or more desired locations of Step (vi) include $F_C$ outputs at locations n/3; 3n/4. In still yet another embodiment, the one or more desired locations of Step (vi) include $F_C$ outputs at locations 0; n/2.

In another embodiment, the present invention relates to a method for computing a Fast Fourier Transform (FFT) comprising the steps of: (a) inputting into a first processor a first subset of values of a vector defined as {x(0); x(n/2)}; (b) inputting into a second processor a second subset of values of the vector defined as {x(n/4); x(3n/4)}; (c) subjecting the input values for the first and second processors to phase correction; (d) subjecting the values in the first and second processors in Step (c) to $F_C$ transform and/or $F_D$ transform using an appropriate means whereby at least one output is generated; (e) computing the even/odd version of the at least one output of step (d); and (f) computing the sums and differences of the results generated by the first and second processors.

In one instance, the above method further utilizes subsets of values of the vector that include:

{x(n/8); x(3n/8); x(5n/8); x(7n/8)};
{x(n/16); x(3n/16); x(5n/16); x(7n/16); x(9n/16); x(11n/16); x(5n/8); x(7n/8) x(11n/16); x(13n/16); x(15n/16)};
etc., wherein each additional subset of values of the vector is input into its own processor.

In one embodiment, the $F_C$ and/or $F_D$ transform of Step (d) is accomplished using one or more of the following Equations:

$$F_C \cdot x = yex + i \cdot yox,$$

$$F_D \cdot X = ydex + i \cdot ydox,$$

$$F_C^{-1} \cdot x = yex - i \cdot yox, \text{ or}$$

$$F_D^{-1} \cdot x = ydex - i \cdot ydox.$$

In one embodiment, the above method involves computing the sums and differences of three or more processors in Step (f).

In still another embodiment, the present invention relates to a method for parallel filtering via Fast Fourier Transform (FFT), the method comprising the steps of: (A) inputting at least two sets of vector values of a vector x; (B) computing at least two sums and at least two differences from the input set of vector values from vector x; (C) calculating at least two sets of halves of an even/odd versions of at least two sets of results from Step (B); (D) computing at least one set of DCT/DST of the even/odd halves, respectively; (E) extending the results of the computation of Step (D) and combining the results using appropriate means; (F) outputting at least two values with correct magnitudes at one or more desired locations; (G) inputting into a first processor a first subset of the values that are output in Step (F); (H) inputting into a second processor a second subset of the values that are output in Step (F); (I) subjecting the input values for the first and second processors to phase correction; (J) subjecting the values in the first and second processors in Step (I) to $F_C$ transform and/or $F_D$ transform using an appropriate means whereby at least one output is generated; (K) computing the even/odd version of the at least one output of step (J); and (L) computing the sums and differences of the results generated by the first and second processors.

DETAILED DESCRIPTION OF THE INVENTION

Figure 1A:
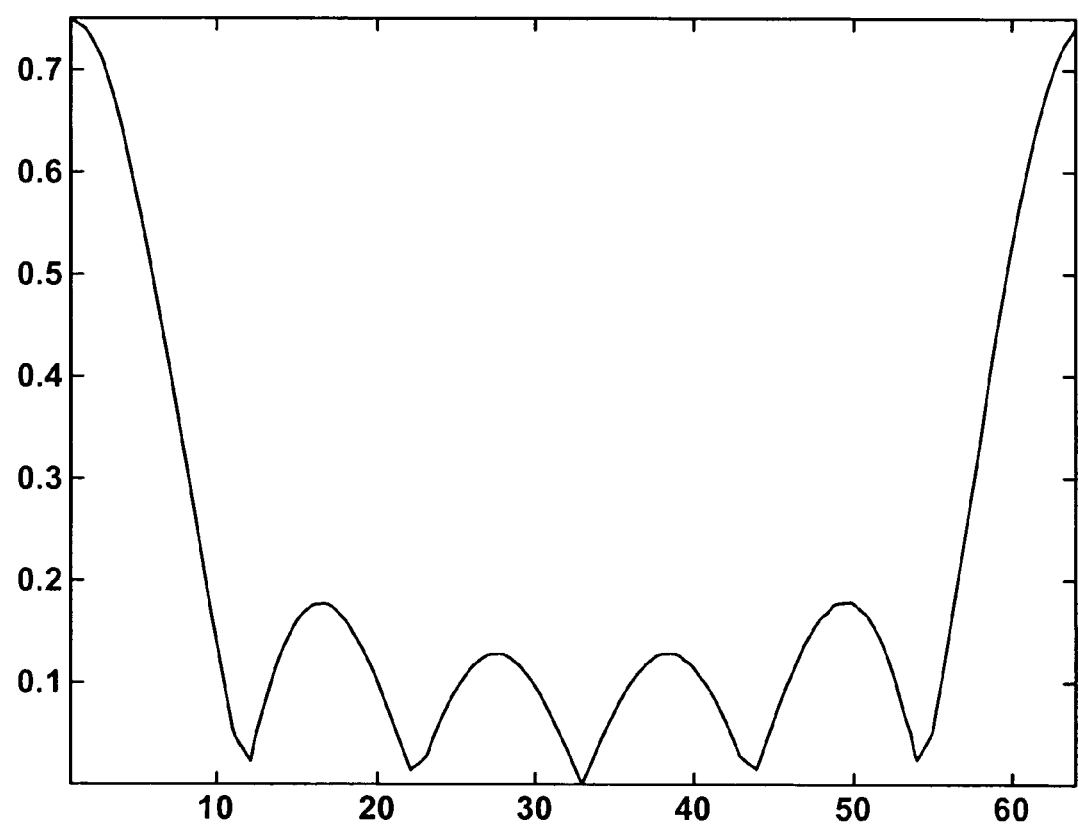
FIG. 1A is a representation of a traditional Fourier transform (using $F_B$) of a step function.

The present invention generally relates to a method for computing a Fast Fourier Transform. In one embodiment, the present invention relates to an interleaved method for computing a Fast Fourier Transform.

In one embodiment, the present invention relates to a method for computing a Fast Fourier Transform (FFT) that involves, among other things, three major points that contribute, in part, to a new interleaved method of FFTs. These are: (1) the interleaving method of intertwining the output of two different shifted Fourier matrices, $F_C$ and $F_D$, to obtain the $F_D$ Fourier transform of a vector that is twice the length, and the corresponding computational tree that applies at different levels; (2) an even-odd extension theorem for computing the centered Fourier transform $F_C$; and (3) a method of grouping various terms in the computational tree so as to reduce the number of applications of the shifted matrices, and the resulting segmentation of the computation that allows parallel implementation. Based in part on the above, the present invention yields a method of computing the FFT that includes a number of options to a user, so that some items that must be computed in the traditional method are optional with the method of the present invention. One advantage of the present invention is the ability to do a FFT or inverse FFT computation with a parallel processing structure. The present invention will be explained in more detail below.

In one embodiment, the approach of the present invention is at least twice as fast as sequential methods, at least three times as fast, at least five times as fast, or even faster.

The Interleaving Method:

Shifted Fourier Matrices:

Initially, a shifted Fourier matrix is defined as shown in equation (1) below:

$$F_a = \frac{1}{\sqrt{n}} [e^{2\pi i (\mu-a)(v-a)/n}] \quad (1)$$

where a is a real-valued shift parameter and $0 \leq \mu, v \leq n-1$.

Initially, some examples of shift parameters that will be used for the remainder of the text of the disclosure of the present invention will be discussed. Using the value a=0 in the shifted Fourier matrix (Equation (1)) gives the traditional Fourier matrix, labeled $F_B$ as discussed below. If a=(n−1)/2, the shifted Fourier matrix becomes a truly centered Fourier matrix, labeled $F_C$ in the following. And, if a=n/2, the resulting shifted Fourier matrix is labeled the Fourier matrix $F_D$. A portion of the present invention relies on the fact that the centered Fourier matrix has a number of beneficial properties, particularly from a computational point of view. The traditional Fourier matrix $F_B$ and the shifted Fourier matrix $F_D$ are similar, and the result of the action of applying Fourier transforms based on these matrices is a shift to the right of the plot in the traditional case, making the transform appear centered.

In a 5×5 case the centered Fourier matrix is:

$$F_c = \begin{bmatrix} \rho^4 & \rho^2 & 1 & \rho^{-2} & \rho^{-4} \\ \rho^2 & \rho & 1 & \rho^{-1} & \rho^{-2} \\ 1 & 1 & 1 & 1 & 1 \\ \rho^{-2} & \rho^{-1} & 1 & \rho & \rho^2 \\ \rho^{-4} & \rho^{-2} & 1 & \rho^2 & \rho^4 \end{bmatrix},$$

where $\rho = e^{2\pi i/5}$ is the fifth root of unity. This is a shifted version of the traditional Fourier matrix shown below:

$$F = \begin{bmatrix} 1 & 1 & 1 & 1 & 1 \\ 1 & \rho & \rho^2 & \rho^3 & \rho^4 \\ 1 & \rho^2 & \rho^4 & \rho^6 & \rho^8 \\ 1 & \rho^3 & \rho^6 & \rho^9 & \rho^{12} \\ 1 & \rho^4 & \rho^8 & \rho^{12} & \rho^{16} \end{bmatrix}.$$

As illustrations of the action of several different shifted Fourier matrices on vectors, the following examples of the actions of the different matrices on a step function are presented below. It should be noted, that the present invention is not limited to solely the examples contained herein.

Figure 1B:
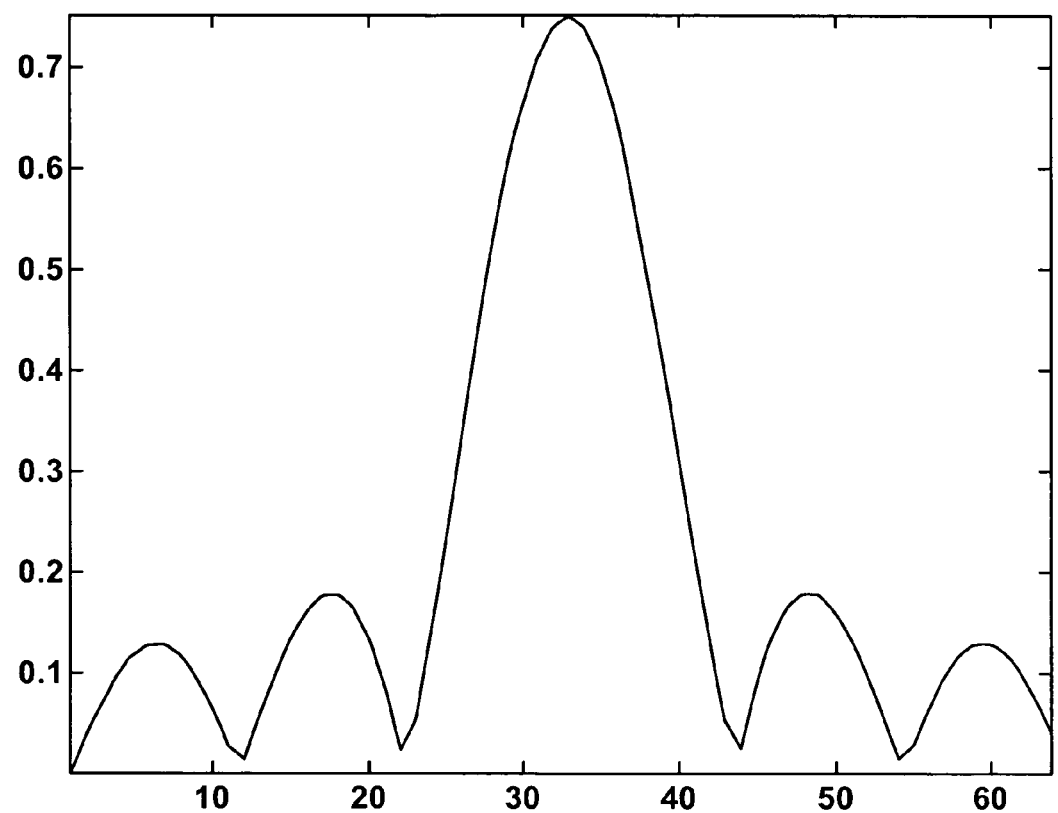
FIG. 1B is a representation of the $F_D$ transform that splits the right half of the result of multiplication by $F_B$ and puts it next to the left half.
Figure 1C:
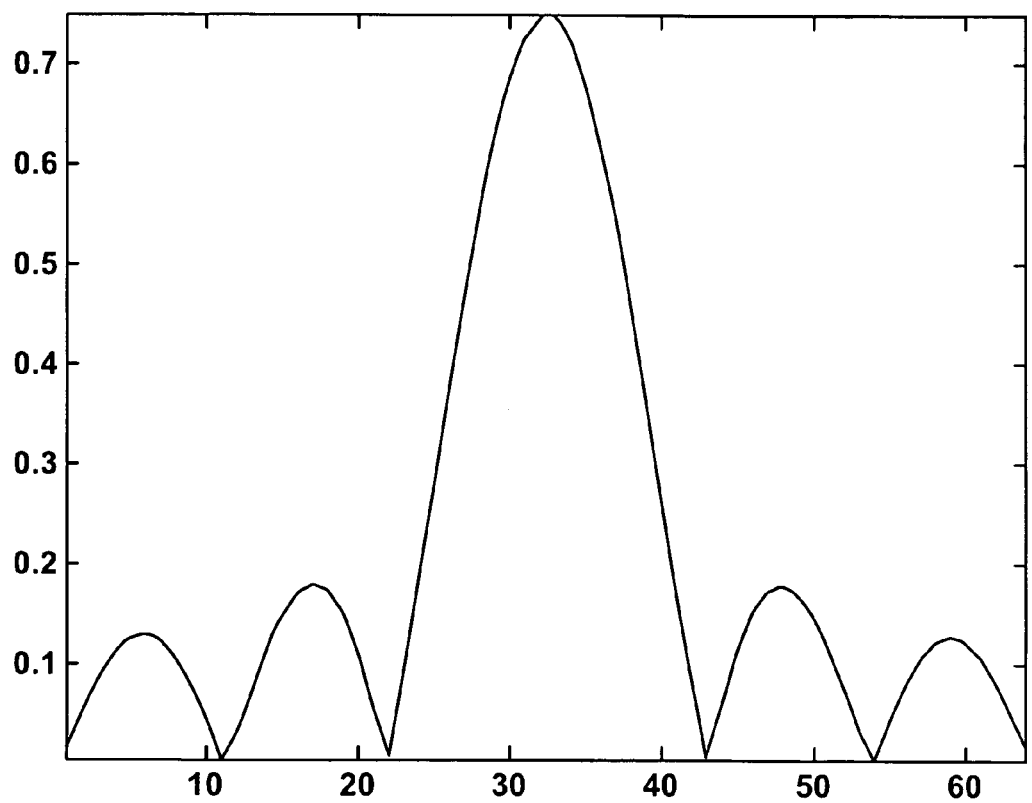
FIG. 1C is a representation of a centered Fourier transform using $F_C$ that has different values than that of the one pictured in FIG. 1B, and is centered (i.e., as a vector it has symmetry)
Figure 2:
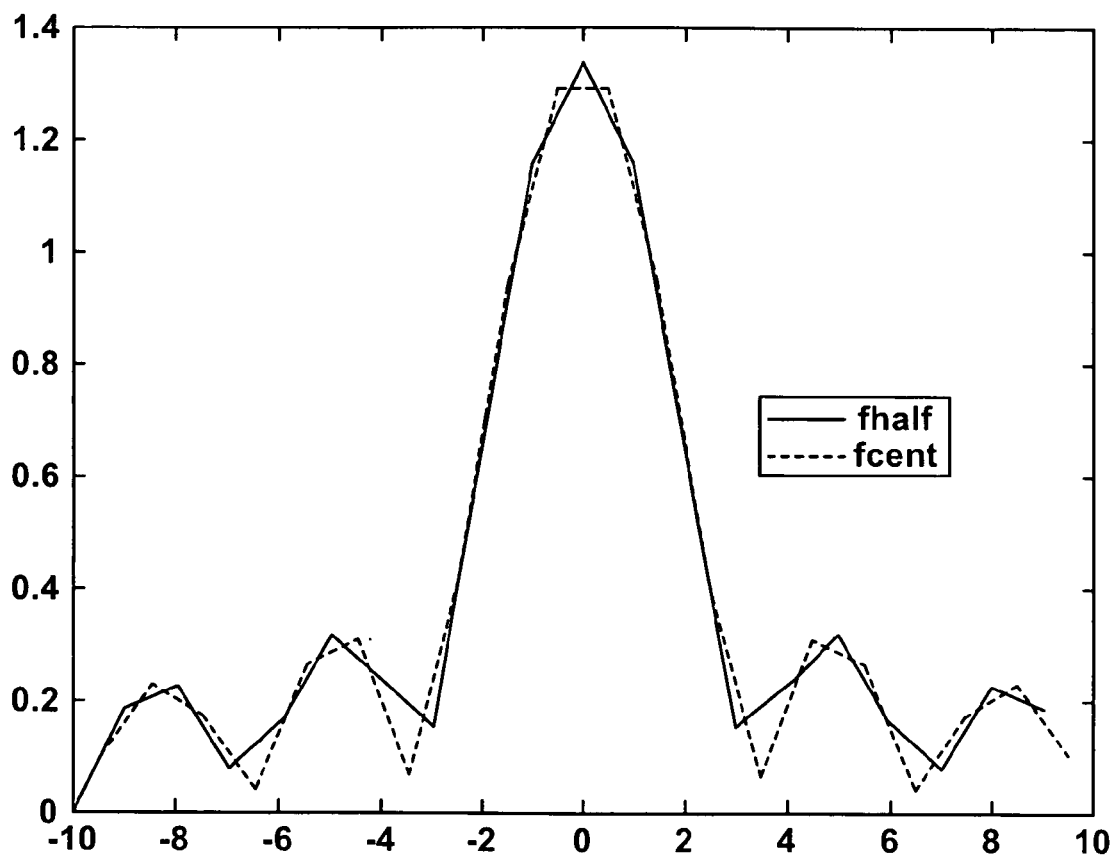
FIG. 2 is a plot (using a smaller number of data values n than in FIGS. 1A through 1C) that illustrates that the transforms associated with $F_D$ and $F_C$ provide different values when applied to a step function, the centered Fourier transform is the one that is symmetric in this Figure.

Turning to the Figures, FIG. 1A is a representation of a traditional Fourier transform (using $F_B$) of a step function; FIG. 1B is a representation of the $F_D$ transform that splits the right half of the result of multiplication by $F_B$ and puts it next to the left half; and FIG. 1C is a representation of a centered Fourier transform using $F_C$ that has different values than that of the one pictured in FIG. 1B, and is centered (i.e., as a vector, it has symmetry). FIG. 2 is a plot (using a smaller number of data values n than in FIGS. 1A through 1C) that illustrates that the transforms associated with $F_D$ and $F_C$ provide different values when applied to a step function, the centered Fourier transform is the one that is symmetric in this Figure.

Interleaving:

In this embodiment of the present invention, the disclosure undertakes a discussion of the fact that the $F_D$ Fourier transform of vector x of length m can be calculated by a method that includes interleaving $F_C$ centered and $F_D$ transforms of half the size of the original vector, n=m/2. The $F_D$ transform is simply a rearrangement of the traditional Fourier matrix $F_B$, so that either of these forms of the traditional Fourier transform can be obtained in this manner.

The interleaving operation of the present invention, starts by separating the input vector into left and right halves. In one embodiment, this includes separating the input as vector x into a left half vector $x_L$ and a right half vector $x_R$, where these halves are defined for n=m/2 by:

$$x_L = [x(1:n) \text{zeros}(n,1)] \quad (2)$$

and $$x_R = [\text{zeros}(n,1) x(n+1:m)] \quad (3).$$

Each of these vectors is the same length as the original vector x and with $x=x_L+x_R$. Thus, $F_D x=F_D x_L+F_D x_R$. Further, the present invention focuses on the left and right halves of the input vector of size n. For that, define:

$$x_l=x(1:n) \quad (4)$$

and $$x_r=x(n+1:m) \quad (5).$$

Figure 3:
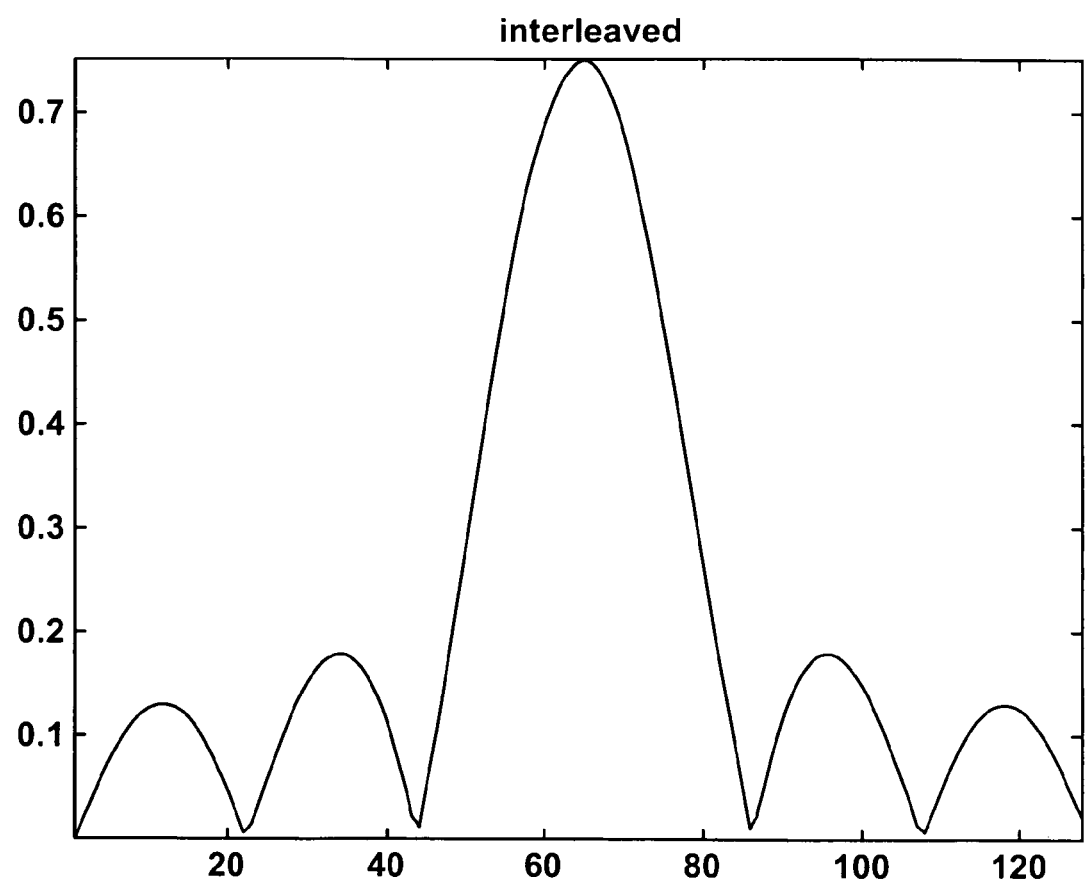
FIG. 3 is a plot that interleaves $F_D x_l$ and $F_C x_l$ values from FIG. 2 resulting in a vector of twice the length (in particular, this is a $F_D$ transform of the vector $x_L$)

These sub-vectors are each half the length of the original input vector. The interleaving operation varies slightly if the length n vector fits into the left half or into the right half of the original input vector x. The left interleaving operation will be to strictly interleave the outputs of $F_C$ and $F_D$ times $x_l$, with a similar idea for the right interleave operation. FIG. 3 illustrates the magnitude of the result of interleaving transforms from output in FIG. 2 using the method described below.

The basic interleaving idea is implemented as follows. First, take the length n transforms: $y_d=F_D x_l$ and $y_c=F_C x_l$. For the interleave left case, strictly interleave the results of these operations, beginning with the modified $y_d$ output. The resulting length m vector has magnitude equal to that of $F_D x_L$. For the interleave right case, change the sign of the entries in $y_c$ before interleaving After this modification, apply the basic interleave step as before. The result is a length m vector with magnitude equal to that of $F_D x_R$.

In this embodiment, no phase adjustments need to be made if only the magnitude of the Fourier transform is desired. In that case, one can omit further computations. If, however, the correct phase is desired, then a few simple phase adjustments need to be made, and those can be done at the end of the computation of the entire set of values.

Tree Structure for the Interleaved Fast Fourier Transform:

The beginning of the tree structure is the computation of the size 2×2 matrix transforms of subsequent length 2 sub-vectors of the input vector. The following is a description of computation of the 2×2 $F_C$ and $F_D$ transforms. This tree structure can be, in one embodiment, simplified as is shown below.

First, for $F_D$, suppose that input vector x is length two, $x=[x_1, x_2]$. The value of the transform is:

$$F_D x=[x_2-x_1, x_1+x_2] \quad (6).$$

Note that this computation does not involve any multiplications.

Next, for $F_C$, the value of the transform is:

$$F_C x=[p_1,p_1]+i[-p_2,p_2] \quad (7),$$

where $p_1=(x_1+x_2)/\sqrt{2}$ and $p_2=(x_2-x_1)/\sqrt{2}$. Given the above, this completes the description of the computation of the 2×2 sized matrices.

Following the computation of the 2×2 matrix transforms, all $F_D$ transforms are computed by interleaving and involve no direct $F_D$ applications. Thus, subsequent computations involve a computation of the centered Fourier transform $F_C$ of the next set of data. This is illustrated in the tree diagram shown in FIG. 4. In one instance, the actual method of the present invention is not done with the tree of FIG. 4.

In the tree diagram, the I label on a branch indicates the output of each part is interleaved to get to the next level, and the + sign indicates an addition of the output. Computation of the $F_C$ transforms can be preformed with a fast transform, as described herein.

The Even-Odd Extension Theorem for Computing the Centered Fourier Transform by $C_4$ and $S_4$ Transforms:

The centered Fourier transform $F_C$ of a vector of length n may be computed using the $C_4$ and $S_4$ matrices applied to length n/2 vectors. There are eight types of discrete cosine transform matrices (see G. Strang, *The Discrete Cosine Transform*, SIAM Review, 41, 135 to 147, 1999)], and $C_4$ is the fourth type, with a similar notation for $S_4$.

The method can be described as follows. For input vector x, which can be complex-valued, first form the even and odd parts of x. Using Matlab notation, this step may be done by:

$$xe=(x+flipud(x))/2, xo=(x-flipud(x))/2,$$

for xe the even part and xo the odd part, with flipud meaning to flip the column vector x "up and down". Thus, one can see that x=xe+xo.

The symmetry of the even and odd xe and xo vectors involves repetition that is not needed. First, take the second half of each of these symmetric vectors xe and xo. If x is of length n, then these new vectors are each of length n/2. Next compute the cosine transform of the second half of the even vector, and the sine transform of the second half of the odd vector:

$$ye:=C_4 \cdot xe(n/2+1:n), yo:=S_4 \cdot xo(n/2+1:n), \quad (8)$$

where each of the resulting vectors is of length n/2. Finally, extend the resulting vectors to be of length n in the following manner: Let yex be the even extension of ye, so that yex is an even vector with sub-vector ye as the latter half of yex. Similarly let yox be the odd extension of yo.

The main result can be expressed by the following equation:

$$F_C \cdot x=yex+i \cdot yox \quad (9).$$

Note that Equation (7) is just a special case of this form. Also of note, at this point, is that the inverse transform only differs from the forward transform in that the plus sign in Equation (9) is replaced by a minus, so that $F_C^{-1} \cdot x=yex-i \cdot yox$.

It is important to note that in this embodiment the actual computations are done in Equation (8) and involve real-valued matrices multiplying possibly complex-valued vectors. Those vectors are not of size n but of size n/2. Note also that if input vector x is even or odd, then half of these computations need not take place, since xo is zero if x is even, and xe is zero if x is odd.

The following is Matlab pseudo-code to preform the computation:

$n=length(x);$ $C4=C4(n/2); S4=S4(n/2);$ $xe=(x+flipud(x))/2; xo=(x-flipud(x))/2;$ $ye=C4*xe(n/2+1:n); yo=S4*xo(n/2+1:n);$ $Fnx=[flipud(ye);ye]+i*[-flipud(yo);yo].$ This result reduces the computation of the $F_C$ transforms to that of the $C_4$, $S_4$ applications. These can be computed in a fast algorithm that starts with fast algorithms for $C_2$ and $S_2$ applications. These are described in P. Lee and F.-Y. Huang, *Restructured Recursive DCT and DST Algorithms*, IEEE Trans. Sig. Proc., v. 42 (7), pp. 1600 to 1609, 1994; and Z. Cvetkovic and M. V. Pepovic, *New fast recursive algorithms for the computation of discrete cosine and sine transforms*, IEEE Trans. Sig. Proc., v. 40 (8), pp. 2083 to 2086, 1992. Then a fast way computing the $C_4$ transform from the $C_2$ transform result is given in C. W. Kok, *Fast Algorithm for Computing Discrete Cosine Transform*, IEEE Trans. Sig. Proc., v. 45 (3), pp. 757 to 760, 1997.

The following exemplary proof of Equation (9) involves the structure of the $F_C$ matrix and the even and odd vectors, xeh=xe(n/2+1:n) and xoh=xo(n/2+1:n), respectively. The vectors xeh and xoh are half the length of the original input vector x. Note that xe is the even extension of xeh and that xo is the odd extension of xoh.

Proof of Equation (9):

Let R be the n×n reversal matrix that has 1's on the diagonal that goes from bottom left to upper right of an otherwise zero matrix. Pre-multiplying a matrix A by R to determine R·A reverses the order of each individual column in A. But post-multiplying a matrix A by R to determine A·R reverses the order of the columns in matrix A. It is not difficult to verify that:

$$F_C = \frac{1}{2}\begin{bmatrix} R \cdot C_4 \cdot R & R \cdot C_4 \\ C_4 \cdot R & C_4 \end{bmatrix} + \frac{i}{2}\begin{bmatrix} R \cdot S_4 \cdot R & -R \cdot S_4 \\ -S_4 \cdot R & S_4 \end{bmatrix}, \quad (10)$$

Pre-multiplying a column vector by R simply reverses the order of this column vector, so that:

$$x = xe + xo = \begin{bmatrix} R \cdot xeh \\ xeh \end{bmatrix} + \begin{bmatrix} -R \cdot xoh \\ xoh \end{bmatrix}.$$

Thus, $$F_C \cdot x = F_C \cdot \begin{bmatrix} R \cdot xeh \\ xeh \end{bmatrix} + F_C \cdot \begin{bmatrix} -R \cdot xoh \\ xoh \end{bmatrix}. \quad (11)$$

Consider the application of $F_C$ in the first term of Equation (11) with the first term in the representation for $F_C$ is as given in Equation (10). This term becomes $$\frac{1}{2}\begin{bmatrix} R \cdot C_4 \cdot R & R \cdot C_4 \\ C_4 \cdot R & C_4 \end{bmatrix} \cdot \begin{bmatrix} R \cdot xeh \\ xeh \end{bmatrix} = \frac{1}{2}\begin{bmatrix} R \cdot C_4 \cdot R \cdot R \cdot xeh + \\ R \cdot C_4 \cdot xeh \\ C_4 \cdot R \cdot R \cdot xeh + \\ C_4 \cdot xeh \end{bmatrix}. \quad (12)$$

But R is self-inverse, so that R·R=I, and the right side of Equation (12) becomes $$\begin{bmatrix} R \cdot C_4 \cdot xeh \\ C_4 \cdot xeh \end{bmatrix}$$

which is simply the even extension of xeh, as claimed.

Next, consider the application of $F_C$ in the first term in Equation (11) with the second part of the representation for $F_C$ as given in Equation (10). This term becomes $$\frac{i}{2}\begin{bmatrix} R \cdot S_4 \cdot R & -R \cdot S_4 \\ -S_4 \cdot R & S_4 \end{bmatrix} \cdot \begin{bmatrix} R \cdot xeh \\ xeh \end{bmatrix} = \frac{1}{2}\begin{bmatrix} R \cdot S_4 \cdot R \cdot R \cdot xeh - \\ R \cdot S_4 \cdot xeh \\ -S_4 \cdot R \cdot R \cdot xeh + \\ S_4 \cdot xeh \end{bmatrix}. \quad (13)$$

But using R·R=I, as above, the right side of Equation (13) becomes the zero vector. Thus, the first term in Equation (11) becomes:

$$yex = \begin{bmatrix} R C_4 \cdot xeh \\ C_4 \cdot xeh \end{bmatrix}$$

as claimed. The application of $F_C$ to the second term in Equation (11) can similarly be shown to be:

$$i \cdot yox = i \cdot \begin{bmatrix} -R \cdot S_4 \cdot xoh \\ S_4 \cdot xoh \end{bmatrix}.$$

Inverse $F_C$ Transform:

It can be shown that the matrix inverse to $F_C$ is its own third power, i.e. $F_C^{-1}=F_C^3$. In particular, this is related to the result that the $F_C$ matrix has eigenvalues that are only from the set $\{\pm 1, \pm i\}$, so that $F_C \cdot F_C^3 = F_C^4 = I$.

Further, it can be shown that $F_C^2 = R$, where R is the "reversal" matrix used in the proof above. Thus $$F_C^{-1} = F_C^2 \cdot F_C = R \cdot F_C \quad (14).$$

But applying Equation (14) along with Equation (9) shows that $$F_C^{-1} \cdot x = R \cdot F_C \cdot x = R \cdot (yex + i \cdot yox) = R \cdot yex + i \cdot R \cdot yox \quad (15)$$

The reversal matrix R has no effect on the even vector yex; but R·yox=−yox. This means that $$F_C^{-1} \cdot x = yex - i \cdot yox \quad (16)$$

The Modified Even-Odd Extension Theorem for Computing the $F_D$ Fourier Transform by $C_1$ and $S_1$ Transforms:

The present invention utilizes, in one embodiment, Matlab programs for the computation of the $F_D$ matrix transform of a vector, using sub-matrices $C_1$ and $S_1$ multiplying "even" and "odd" terms from the input vector. It should be noted that the present invention is not limited solely to the use of Matlab programs. Rather, any suitable program could be used and/or developed based on the teachings contained within the present text.

The main result can be expressed by the following Equation:

$$F_D \cdot x = ydex + i \cdot ydox \quad (17).$$

For input vector x, which may be complex-valued, first form adjusted "even" and "odd" parts of x. Using Matlab notation, this step may be done by:

$$xe=(x+r \cdot x)/2; xo=(x-r \cdot x)/2,$$

where r is the matrix with one's going up on the "superdiagonal" (the diagonal+1) and a 1 in the lower right corner, for xe the even part and xo the odd part. It can be seen that x=xe+xo.

The symmetry of the even and odd xe and xo vectors involves repetition that is not needed. The vector xe has xe(n) fixed, but has even symmetry otherwise. A similar situation exists for xo. Ignoring symmetry, if x is of length n; then xe may be completely described using n/2+1 points, and xo with n/2−1 points. Next compute the cosine transform $C_1$ of the appropriate part of the xe vector, and the sine transform $S_1$ of the appropriate part of the xo vector.

$$ye:=C_1 xe(n/2:n); yo:=S_1 xo(n/2+1:n-1) \quad (18).$$

Finally, extend the resulting vectors to be of length n in the following manner: let $$ydex=[\mathit{flipud}(ye(2:n/2)); ye].$$

Similarly let $$yox=[-\mathit{flipud}(yo); 0; yo; 0].$$

The result is the formula for $F_D$ provided above. Similar to the result for $F_C$ in the previous section, the inverse $F_D$ transform can be computed by changing the sign in Equation (17) to read ydex−i·ydox.

Figure 4:
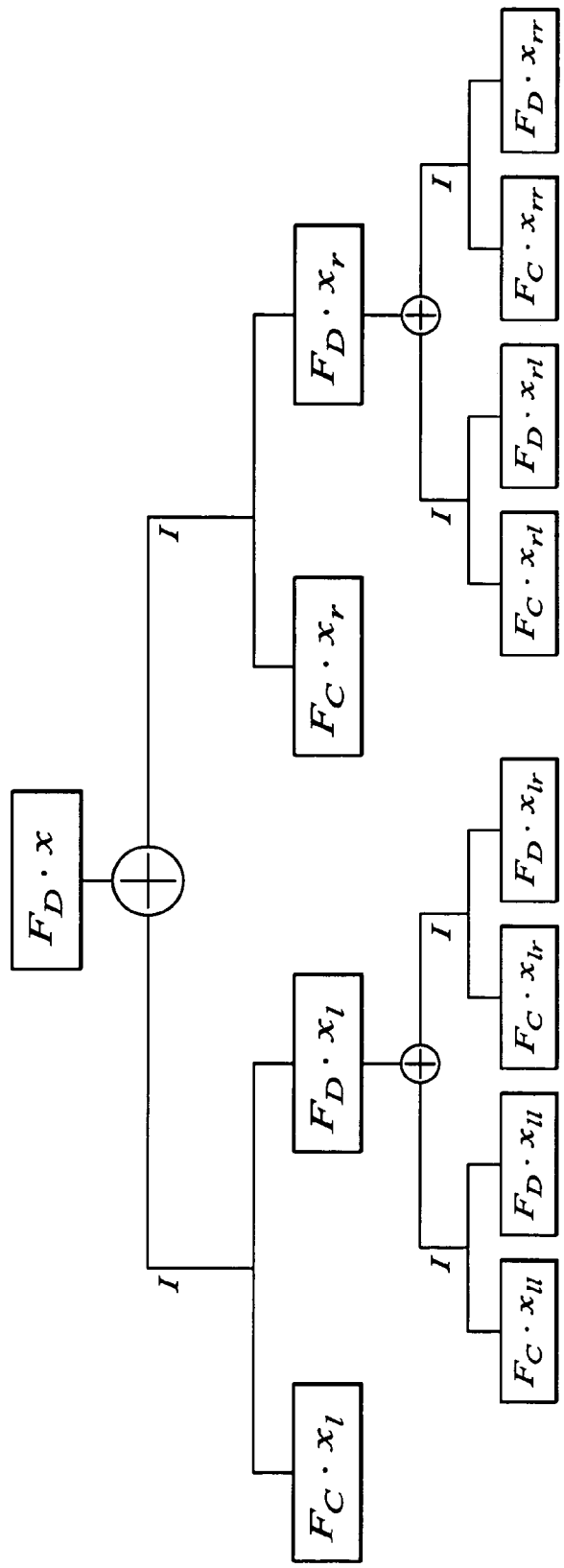
FIG. 4 is a tree diagram relating to the present invention.
Figure 5:
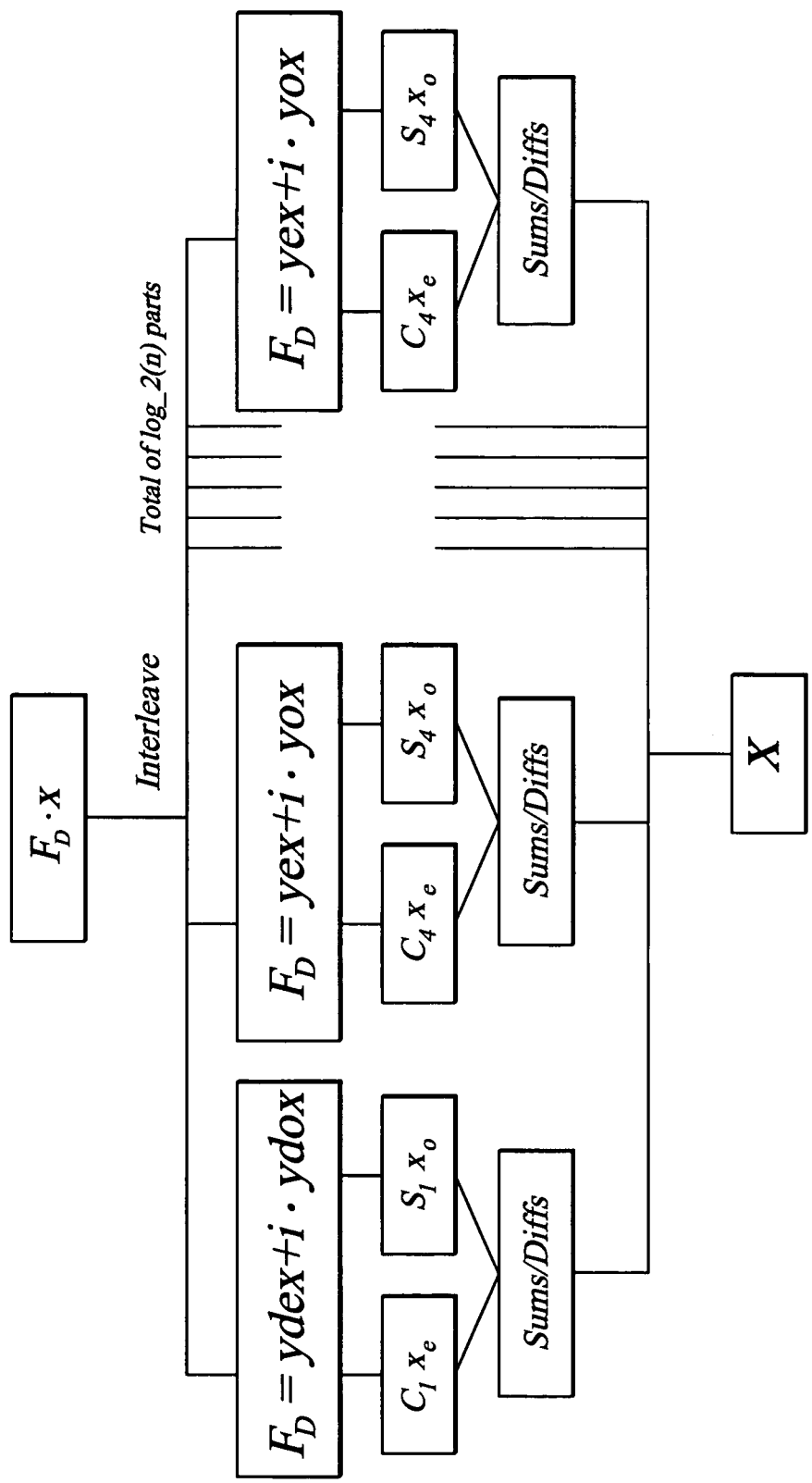
FIG. 5 is another tree diagram relating to the present invention.

A Method of Reducing the Number of $C_4$,$S_4$ Applications and the Parallel Implementation:

The tree structure, as illustrated in FIG. 4, discussed above can be simplified, via the present invention, thereby reducing the amount of computations dramatically. This allows a parallel implementation of the computation. See the computational diagram of FIG. 5 for an exemplary sequential implementation.

First, the tree structure shows a number of different $F_D$ applications to 2×2 sub-vectors. However, this can be reduced to a single $F_D$ application, by simply applying the summation first. There is a similar result for the applications of $F_C$. That is, each of the $F_C$ computations that are done for a part of the computational tree of FIG. 4, that are at the same level, can be done by a single $F_C$ application involving a $C_4$, $S_4$ implementation as described in "The Even-Odd Extension Theorem for Computing the Centered Fourier Transform by $C_4$ and $S_4$ Transforms" section above, following a summation. That summation depends on the level in the tree, and is described herein.

This technique segments the computations, breaking the computational tree of FIG. 4 into separate independent segments. In particular, there are $\log_2(n)$ independent segments, where n is the length of the input vector x.

The segment related to the $F_D$ application results in determining precisely two output values: the dc and the value in the n/2 location of the final output. The segment connected to the $F_C$ applications at the lowest level of the computational tree discussed earlier, and in FIG. 4, and results in the determination of exactly two output values at locations n/4 and 3n/4 in the output vector. The segments connected to $F_C$ applications at the next highest levels of the computational tree produce an exponentially increasing number of output values. For example, the segment connected to the third level of the tree produces four output values, at locations n/8, 3n/8, 5n/8, 7n/8.

In general, the computation is segmented into $\log_2(n)$ different components, and the output produced by those different components is at locations:

0, n/2
n/4, 3n/4
n/8, 3n/8, 5n/8, 7n/8
n/16, 3n/16, 5n/16, 7n/16, 9n/16, 11n/16, 13n/16, 15n/16
etc.

Other than the first segment listed above, the typical segment produces an output of transforms values at locations $$(2k+1) \cdot \frac{n}{2^j}$$

for k=0, 1, ..., $2^{j-1}$−1 for j=2, ..., $\log_2(n)$−1. The results are independent and can be computed in parallel, then interleaved into the correct position for the transform value.

Pre-Transform Processing:

The summations at each level of the tree, as noted above, can be done prior to the $F_C$ application.

Prior to the DCT/DST transformations, the set of sums/differences can be done all at once, or partially done for the parallel implementation, as described in the following section. In order to do a complete set of summations, one coding that can be used involves two n×$\log_2(n)$-sized matrices A (additions) and D (differences). The first column of A is input vector x, the first column of D is undeclared. Then a loop of form:

$m=n;$ for $k=1:\log_2(n)$;

$m=m/2;$ $A(1{:}m,k)=A(1{:}m,k-1)+A(m+1{:}2{*}m,k-1);$ $D(1{:}m,k)=A(1{:}m,k-1)-A(m+1{:}2{*}m,k-1);$ is enough to compute the sums A and differences D needed for the complete pre-processing. The total flop count for this step is 2n−4, if all done at once for the sequential computation.

Then for matrix C of size n/2×log(n) the sums/differences are of the same data, but folded:

$C(1{:}2,1)=[A(1,p)-A(2,p);A(1,p)+A(2,p)];$ $C(1{:}2,2)=[D(2,p)+D(1,p);D(2,p)-D(1,p)];$

With initial value of m=2, a loop constructs the rest of matrix C as follows;

for $k=1:\log_2(n)-2$;

$C(1{:}2{*}m,2+k)=[D(m+1{:}2{*}m,p-k)+\text{flipud}(D(1{:}m,p-k));D(m+1{:}2{*}m,p-k)-\text{flipud}(D(1{:}m,p-k))];$ $m=2{*}m.$ The resulting matrix C is the input to the DCT/DST transforms, as described below. The total number of flops for the entire set of computations of this section is $3/2n \log_2(n)-3/2n+2$; assuming real data.

Figure 6:
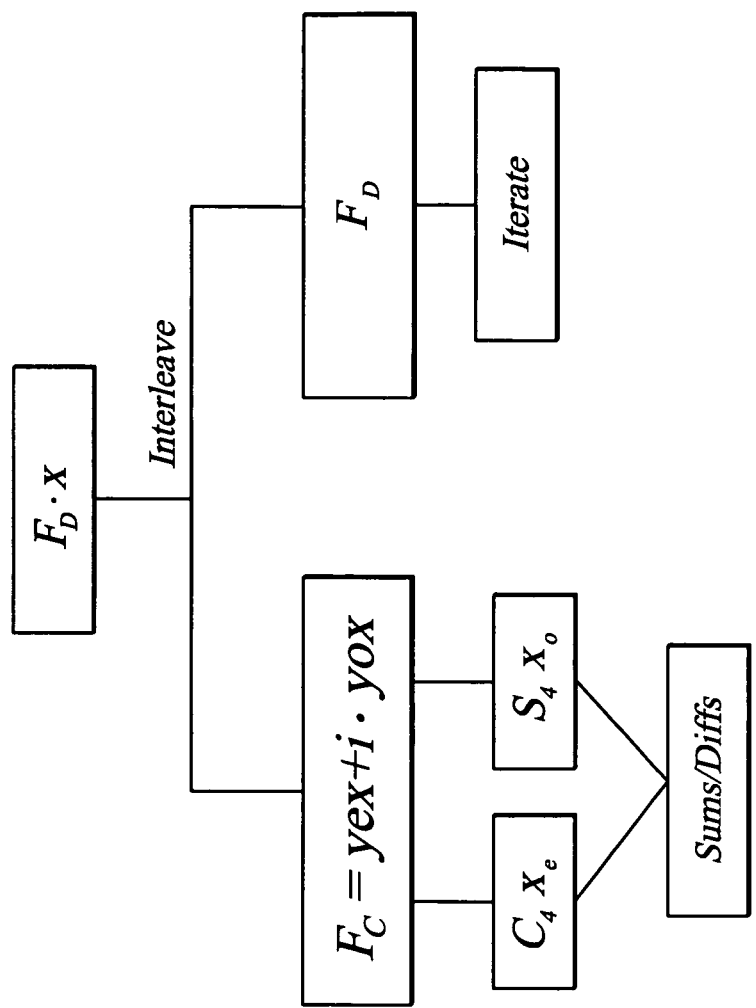
FIG. 6 is still another tree diagram relating to the present invention.

Details:

For determining the flop count of the individual parts of the parallel implementation, it is important to note that the total number of additions/subtractions prior to the $F_C$ application is independent of the part described below, and totals n in each case. The flop count is computed assuming real data. The computational structure for the parallel implementation is given in FIG. 6.

Case 1: Largest Output:

This independent computation produces $F_D$ output at locations 1; 3; 5; ... n−1, where the vector output is labeled 0 through n−1. This requires subroutine (1)'s D(:, 2), the second column of matrix D; which uses a difference of halves of input vector x. The flop count is n/2. Subsequently, it requires subroutine (2)'s C(:, p), the p'th column of matrix C; which is computed using a flip, then a sum and difference of halves of D(:, 2). This is a flop count of n/4+n/4 for a total flop count of n. This input is the xe and xo that goes into the $F_C$ computation as discussed in "The Even-Odd Extension Theorem for Computing the Centered Fourier Transform by $C_4$ and $S_4$ Transforms" section above.

Case 2: Next Largest Output:

This independent computation produces $F_D$ output at locations 2; 6; 10; ... n−2. This requires subroutine (1)'s D(:, 3), the third column of matrix D; which uses a difference of halves of the second column of add matrix A(:, 2) of subroutine (1). The flop count is n/2+n/4. Subsequently, this requires subroutine (2)'s C(:, p−1), the (p−1)st column of matrix C; which is computed using a flip, then a sum and difference of halves of D(:, 3). This is a flop count of n/4 for a total flop count of n.

This pattern continues. One continues the details with the output at four locations.

Case p−2: Output at n/8; 3n/8, 5n/8; 7n/8:

This independent computation requires subroutine (1)'s D(:, p−1), the (p−1)st column of matrix D; which uses a difference of halves of the p−2nd column of A, and that is computed recursively. Flop count $n/2+n/4+n/8+\ldots+n/2^{p-2}=2^p-4=n-4$. Subsequently, this requires subroutine (2)'s C(:, 3), the third column of matrix C; which is computed using a flip, then a sum and difference of halves of D(:, p−1), which is of length 4. That's a flop count of 4 for a total flop count of n−4+4=n.

Case p−1: Output at n/4; 3n/4:

This independent computation requires subroutine (1)'s D(:, p), the pth column of matrix D, which utilizes a difference of halves of the p−1st column of A, and that is computed recursively. Flop count $n/2+n/4+n/8+\ldots+n/2^{p-2}=2^p-2=n-2$. Subsequently, it requires subroutine (2)'s C(:, 2), the second column of matrix C; which is computed using a flip, then a sum and difference of the one-element halves of D(:, p), which is of length 2. That's a flop count of 2 for a total flop count of n−2+2=n.

Case p: Output at 0; n/2:

Depending on the parallel implementation, this operation can be included with the previous case. The cases listed above output the xe and xo inputs to the $F_C$ computation as described in "The Even-Odd Extension Theorem for Computing the Centered Fourier Transform by $C_4$ and $S_4$ Transforms" section above. However, this case outputs final $F_D$ values and needs no further computation. This case requires subroutine (1)'s A(:, p) column, so that many of the computations of the previous case are repeated herein. This column of A consists of two entries and the first column of matrix C; whose values are the final values at locations 0 and n/2. The flop count to get these values is the same as the previous case.

Reversing the Order of the Computation and Parallel Filtering:

In another embodiment, the present invention relates to a method that permits a reversal in the order of computation and still permits parallel Fast Fourier Transform (FFTP).

As is stated above, in this embodiment, the order of the different types of computations in the FFTP algorithm can be reversed, resulting in an algorithm that can be combined with the FFTP computation as discussed above to yield a new method for parallel filtering that requires very little communication among different processors.

Background: Filtering in the Frequency Domain:

Filtering is very effective in the frequency domain, but both a forward and an inverse FFT are required. This type of filtering makes use of the relation that the transform of a convolution is the simple product of the transforms of the two signals in the convolution. That is, for input signal x and filter function h, the filter represented by convolution x*h is equivalent to the inverse Fourier transform of the simple product X·H; where X is the transform of x and H is the transform of h.

Computing the FFTP in the Reverse Order:

In one embodiment, the order of the FFTP computation as outlined above includes.

(i) Compute sums and differences of input vector x (pre-processing);

(ii) Calculate halves of even/odd versions of some results of the sums/differences;

(iii) Compute the DCT/DST of even/odd halves, respectively;

(iv) Extend (using symmetries) the results of the previous computation and combine using Equation (9) or (17);

(v) Output the values with the correct magnitude at the locations listed in the section entitled "A Method of Reducing the Number of $C_4, S_4$ Applications and the Parallel Implementation" above, and interleave.

In this embodiment, one has the option of performing a phase correction at the end of the computation to obtain the correct phase at each point.

In another embodiment, a different method of computing the FFT is obtained by completely reversing this order of computation. In this embodiment, the input to each processor is a small subset of values of the original vector. For example, one processor would have input {x(0); x(n/2)} and another would have input {x(n/4); x(3n/4)}, and so forth. These sets of input values are the same as those sets listed for the output, as is discussed above. The approach of this embodiment has the advantage of simplifying the input to each processor, since only a subset of the original vector is input to each processor.

Next, the input values need to be phase corrected. Then the $F_C$ transform is applied using Equation (9) or (17), and then the even/odd version of the output is computed. The final step in this reverse ordering is the computation of the sums and differences of the results of each processor, where the output of each processor is combined.

Note that this reverse order of the computation is not computing an inverse transform but is computing the correct transform in a different but still parallel manner. One additional item that is needed for this embodiment, is that the phase correction must be applied to the input, which is simply an option in the previous embodiments discussed above.

Parallel Filtering:

One advantage of the approach described immediately above is in combining it with the computational method described earlier to create a frequency domain filtering option that can be done in parallel with very little communication among processors.

If h is the vector of filter coefficients and x is the input vector, then this filtering computes the convolution x*h by transforming to the Fourier domain, multiplying the transforms, and then inverse transforming the result to end in the time domain.

In one embodiment, this parallel filtering method begins with the computational method in the original order, as is noted above. The program introduces both x and h into the processors as described above. The sums/differences preprocessing step can be performed using the same type of computations on each of x and h independently. Then each processor receives the appropriate pre-processed output for both x and h; so that the input vector and filter coefficients will remain in that processor. At the end of the above five step process, the output results in one processor containing a subset of values of the transform of x and the same subset of values of the transform of h. For example, one processor contains {X(0); X(n/2)} and {H(0); H(n/2)}; a second processor containing {X(n/4); X(3n/4)} and {H(n/4); H(3n/4)}; and so on. These Fourier transform values are then multiplied in that processor in each case. That part completes the computation of both the Fourier transform of x and of h and the multiplication in the frequency domain of their Fourier transforms.

To return to the time domain with the filtered signal, the inverse transform needs to be computed. But the input to the FFTP algorithm in the reverse order can be, in one embodiment, just the multiplied values. For example, {X(0)·H(0), X(n/2)·H(n/2)} in one processor, {X(n/4)·H(n/4), X(3n/4)·H(3n/4)} in another processor, and so on, as described for the algorithm in reverse order above. The rest of the process proceeds in the reverse order, with the one adjustment that inverse transform is applied, as in Equation (16) or the similar result for the inverse of $F_D$, instead of the forward transform. The output is the correct filtered signal.

This embodiment of the present invention, is believed to be a radically new way of computing the filtered values of an input vector x by filter h, and is believed to be faster than standard filtering operations when employing a parallel processor.

Figure 7:
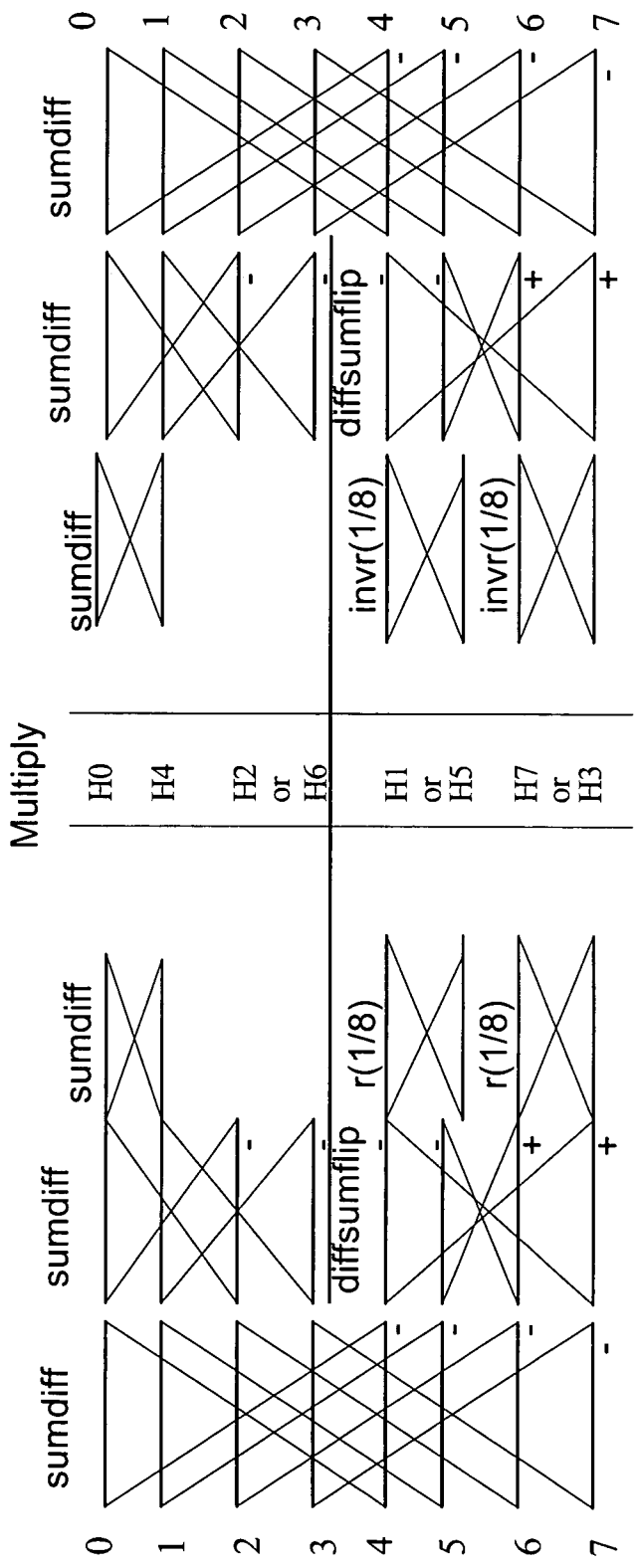
FIG. 7 is a diagram showing the progression of an 8 point FFTP parallel filtering technique relating to the present invention.

FIG. 7 illustrates the idea of filtering in the frequency domain using parallel filtering and accomplishing the same in much less time. The Figure is particular to the case of a length 8 vector, but this is similar to filtering with the Fourier Transform for a vector whose length is an arbitrary power of 2, i.e., $L=2^n$ for $n \geq 1$.

FIG. 7 flows from left to right. The vector's components are labeled 0 through 7, and are listed vertically in the leftmost column. Filtering in the Fourier domain is accomplished by: (i) computing the Fourier Transform of the input vector using a parallel computation technique; (ii) multiplying that result by the symmetric filter function H, using term-by-term multiplication, but omitting the calculation corresponding to the expression:

Fnx=[flipud(ye);ye]+i*[-flipud(yo);yo]

which is a portion of the Matlab pseudo-code for performing the computation; and (iii) applying the Fourier Transform in the reverse order to the result.

In FIG. 7, step (i) is done in the first three columns, for the vector of length 8, though any vector length fitting the format may be used. The first three columns indicate the operations executed upon the input vector using the interleaved computation of the FFT. Alternatively, any parallel computation technique may be used in place of the interleaved computation.

It is important to note that according to this method, certain operations need not be done because the filtering operation does not need the FFT output in the correct order. For example, the calculation corresponding to the expression for the Matlab pseudo-code referred to above may be omitted.

The operations "sumdiff" and "diffsumflip" are vector operations and are defined as follows: sumdiff(x(1:n))=[x(1: n/2)+x(n/2+1:n), x(1:n/2)−x(n/2+1:n)], and diffsumflip(x(1: n))=[(x(n:−1:n/2+1)−x(1n/2), x(n/2:−1:1)+x(n/2+1:n)]. Modern computers have vector operation capabilities, so these operations can be done quickly. The other operations in FIG. 7 are the operations of rotation "r" and inverse rotation "invr." These operations are well-known to those working in this field. For example, a rotation "r" of angle pi/8 is symbolized in FIG. 7 as "r(⅛)", and takes the vector [x(1), x(2)] to the vector [c*x(1)+s*x(2),−s*x(1)+c*x(2)], where c=cos(pi/8) and s=sin(pi/8).

In FIG. 7, step (ii) is done in the middle, at the point where the Figure uses vertical lines. The filter function H values are not applied in order, but in a permuted order, as indicated.

Step (iii) of FIG. 7 shows the inverse Fourier Transform, or the Fourier Transform in reverse order, in the final three columns, again flowing left to right. The operations are nearly the same as for step (i), and the output is in the same order as the original input. This output is the filtered input.

The parallelism is inferred by the diagram with the broad horizontal line separating parts of the computation. For this small vector length of 8, just two processors would be employed, and the computations illustrated in columns 2 through 6 may be completely separated and done by two processors. For a vector of larger length, the number of processors could be much more than two.

Computational Advantages of the Interleaved Method:

There are a number of computational advantages for the interleaving method of computing the FFT.

(1) One advantage of the present invention is that the result of the computation is the standard DFT. The same as computed by the old Cooley-Tukey method;

(2) Another advantage of the present invention is that since the computation can be done with independent segments, parallel computing methods can be used to simultaneously compute the different terms that are needed for interleaving. This contrasts with traditional methods, since parallel computing is not effective in increasing the speed of computation for the standard Cooley-Tukey method;

(3) Another advantage of the present invention is that the number of floating point operations is low for the computation as discussed above, independent of the parallel implementation;

(4) Still another advantage of the present invention is that the inverse transform and the forward transform can be computed simultaneously; and (5) Still another advantage of the present invention is that in general, the computation is segmented into $\log_2(n)$ different components, and the output produced by those different components for a vector of length n is at locations:

0, n/2
n/4, 3n/4
n/8, 3n/8, 5n/8, 7n/8
n/16, 3n/16, 5n/16, 7n/16, 9n/16, 11n/16, 13n/16, 15n/16
etc.

The computation for output at any of those locations can be done independently of the output for the other locations. The results are interleaved to create the complete transform.

(6) Still another advantage of the present invention is that the result of the computation provides the correct absolute value. A twiddle factor computation is applied only if the correct phase is desired, so there are a number of options with the approach of the present invention.

(7) Still another advantage of the present invention is that the inverse transform can be computed with a simple change in the algorithm. In particular, the inverse transform can be computed simultaneously with the forward transform.

(8) Still another advantage of the present invention is that the parallel computation is "embarrassingly" parallel.

(9) Still another advantage of the present invention is that the user has the option of doing a faster computation that is coarser. For example, for the case of a vector of length 16, the user could choose to only perform the calculation of the 8 values at locations n/16, 3n/16, . . . , 15n/16. Those values can be used to provide a coarse output of the transform, based on the higher resolution. In such an embodiment, it would be a trade-off between speed of computation and coarseness of the transform. If desired, the other values could be computed later and included in a higher resolution version of the transform at that time.

This could be particularly helpful for the two-dimensional FFT needed in MRI imaging, where an image of size N×N requires 2N different one-dimensional FFTs to be computed. A coarse version could be presented faster, with the higher resolution filled in later.

One result of the present invention is a radically new method of computing the FFT that includes a number of options to a user, so that some items that must be computed in the traditional Cooley-Tukey method are simply options with the approach of the present invention. One interesting result is the ability to do the FFT or inverse FFT computation with a parallel processing structure. In doing the computation, the speed increases depend on the number of processors available.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A method for generating an MRI (magnetic resonance imaging) image comprising the steps of:
   obtaining a vector of MRI data having one or more vector values;
   computing a Fast Fourier Transform (FFT) of the vector of MRI data, comprising the steps of:
      providing a first processor and a second processor;
      inputting at least one set of vector values of the vector of MRI data into either of the first or second processors;
      computing at least one sum and at least one difference from the input set of vector values from the vector of MRI data;
      calculating from the results of the computing step at least one set of halves of an even vector, such that the even vector has a first half and a second half;
      calculating from the results of the computing step at least one set of halves of an odd vector, such that the odd vector has a first half and a second half;
      computing in parallel simultaneously, at least one set of discrete cosine transform (DCT) of either of the first half or the second half of the even vector by the first processor, and at least one discrete sine transform (DST) of either of the first half or the second half of the odd vector by the second processor;
      processing the output of the discrete cosine transform (DCT) and the output of the discrete sine transform (DST) from the second computing step so that they are made twice as large;
      combining the results of the processing step;
      outputting at least one value from the combining step with a correct magnitude at one or more desired locations;
      interleaving the at least one value to compute the Fast Fourier Transform; and
   generating an MRI image using the Fast Fourier Transform.

2. The method of claim 1, wherein the first computing step is a pre-processing step.

3. The method of claim 1, wherein the processing step is accomplished using symmetries.

* * * * *